US011152987B1

(12) United States Patent
Deshpande

(10) Patent No.: US 11,152,987 B1
(45) Date of Patent: Oct. 19, 2021

(54) DIRECTION-OF-ARRIVAL ESTIMATION FOR SIGNAL-OF-OPPORTUNITY RECEIVER

(71) Applicant: United States of America as represented by the Administrator of NASA, Washington, DC (US)

(72) Inventor: Manohar Deshpande, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 145 days.

(21) Appl. No.: 16/581,931

(22) Filed: Sep. 25, 2019

(51) Int. Cl.
*H04B 7/06* (2006.01)
*H04B 7/185* (2006.01)
*H01Q 9/16* (2006.01)
*H01Q 21/26* (2006.01)

(52) U.S. Cl.
CPC ............ *H04B 7/0617* (2013.01); *H01Q 9/16* (2013.01); *H01Q 21/26* (2013.01); *H04B 7/1851* (2013.01)

(58) Field of Classification Search
CPC .... H04B 7/0617; H04B 7/1851; H01Q 21/26; H01Q 9/16
See application file for complete search history.

(56) References Cited

U.S. PATENT DOCUMENTS

| 2005/0253764 | A1* | 11/2005 | Lee | H01Q 21/0075 |
| | | | | 343/757 |
| 2014/0132449 | A1* | 5/2014 | Roper | H01Q 3/2635 |
| | | | | 342/368 |
| 2017/0237182 | A1* | 8/2017 | Tran | H01Q 1/288 |
| | | | | 343/853 |
| 2019/0089071 | A1* | 3/2019 | Sudo | H01Q 21/24 |
| 2020/0259251 | A1* | 8/2020 | Seo | H01Q 9/0407 |

* cited by examiner

*Primary Examiner* — Jean B Corrielus
(74) *Attorney, Agent, or Firm* — Christopher O. Edwards; Bryan A. Geurts; Helen M. Galus

(57) ABSTRACT

A passive receiver system includes a first cross-dipole antenna on a platform, a second cross-dipole antenna on the platform, a passive receiver, and beam steering logic for the first and second cross-dipole antennas. The beam steering logic steers a radiation beam of the passive receiver in a first direction and steers the radiation beam of the passive receiver in a second direction. The first direction is aligned with a direct signal path and the second direction aligned with a reflect signal path. The platform is of a first satellite and the direct signal path is aligned with a second satellite.

20 Claims, 6 Drawing Sheets

DIRECTION-OF-ARRIVAL ESTIMATION FOR SIGNAL-OF-OPPORTUNITY RECEIVER

BACKGROUND

In recent years, there is increasing interest in the development of technology that allows physical properties of a target of interest (e.g., soil moisture, ocean temperature, wind speed, etc.) to be extracted from ambient electromagnetic (EM) waves created by already existing communication transmitters using simple and less expensive receivers. (The transmitters may be airborne or space-borne and may include ones often referred to as Signal-of-Opportunity transmitters.) The ambient EM waves are received by passive receivers directly from the transmitter and as a result of being reflected from the target of interest and from various unwanted targets.

Existing receivers are unable to differentiate the waves reflected from the target of interest from the waves reflected from unwanted targets. This is mainly attributable to the omnidirectional antennas used by the receiver. Omnidirectional antennas use an unfocused, non-directional broad beam that allows a myriad of unwanted signals to be received. As a result, the desired reflected signal gets contaminated by large numbers of undesired signals and hence prevents the physical properties of the target of interest from being recovered with a sufficient degree of accuracy.

SUMMARY

In accordance with one or more embodiments, a system includes a passive receiver, a first cross-dipole antenna on a platform, a second cross-dipole antenna on the platform, and beam steering logic for the first and second cross-dipole antennas. The beam steering logic is configured to steer a radiation beam of the passive receiver in a first direction and to steer the radiation beam of the passive receiver in a second direction different from the first direction. The first direction is aligned with a direct signal path and the second direction is aligned with a reflect signal path. The platform is of a first satellite and the direct signal path is aligned with a second satellite. The first satellite may be a transmitter or receiver satellite, the second satellite may be a signal-of-opportunity transmitter satellite, and the reflect signal path may be aligned with a target of interest at a surface location.

The beam steering logic may autonomously determine angles-of-arrival for the direct signal path and the reflected signal path. Each of the first cross-dipole antenna and the second cross-dipole antenna may receive signals from both the direct signal path and the reflected signal path because of their close proximity. The passive receiver may be configured to receive signals from the first cross-dipole antenna and the second cross-dipole antenna. The receiver may be at a location between the first cross-dipole antenna and the second cross-dipole antenna on the platform.

The beam steering logic may be configured to maximize a gain of the radiation beam to correspond to the first direction to receive a direct signal from the second satellite, and maximize a gain of the radiation beam to correspond to the second direction to receive a reflected signal from a target of interests at a surface location. The beam steering logic may be configured to control a first set of weights to steer the radiation beam in the first direction and control a second set of weights to steer the radiation beam in the second direction, wherein the first set of weights is different from the second set of weights.

The system may include processing logic configured to extract signals from the first cross-dipole antenna in a first frequency band and extract signals from the second cross-dipole antenna in a second frequency band. The first frequency band may be equal to the second frequency band. At least one of the first frequency band and the second frequency band may include a very high frequency (VHF) frequency band. The platform of the first satellite may be a CubeSat platform.

In accordance with one or more embodiments, a system includes a passive receiver, beam steering logic coupled to first and second cross-dipole antennas, and processing logic configured to process signals from the first and second cross-dipole antennas. The beam steering logic is configured to steer a radiation beam of the passive receiver in a first direction and to steer the radiation beam of the passive receiver in a second direction different from the first direction. The first direction is aligned with a direct signal path and the second direction is aligned with a reflect signal path. The first cross-dipole antenna and the second cross-dipole antenna are coupled to a platform of a first satellite and the direct signal path is aligned with a second satellite. The first satellite may be a transmitter or receiver satellite, the second satellite may be a signal-of-opportunity transmitter satellite, and the reflect signal path may be aligned with a target of interest at a surface location.

The target of interest may be located on the earth, each of the first cross-dipole antenna and the second cross-dipole antenna may receive signals from both the direct signal path and the reflected signal path, and the processing logic may be configured to control weights to isolate corresponding ones of the signals at each of the first cross-dipole antenna and the second cross-dipole antenna. The beam steering logic is configured to autonomously determine angles-of-arrival for the direct signal path and the reflected signal path. The passive receiver may be configured to receive signals from the first cross-dipole antenna and the second cross-dipole antenna, and the passive receiver may be at a location between the first cross-dipole antenna and the second cross-dipole antenna.

The beam steering logic may be configured to maximize a gain of the radiation beam to correspond to the first direction to receive a direct signal from the second satellite, and maximize a gain of the second beam to correspond to the second direction to receive a reflected signal from a target of interest at a surface location. The beam steering logic may be configured to control a first set of weights to steer the radiation beam in the first direction and control a second set of weights to steer the radiation beam in the second direction, wherein the first set of weights is different from the second set of weights. The system may include processing logic configured to extract signals from the first cross-dipole antenna in a first frequency band and to extract signals from the second cross-dipole antenna in a second frequency band. The first and second frequency bands may be equal.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
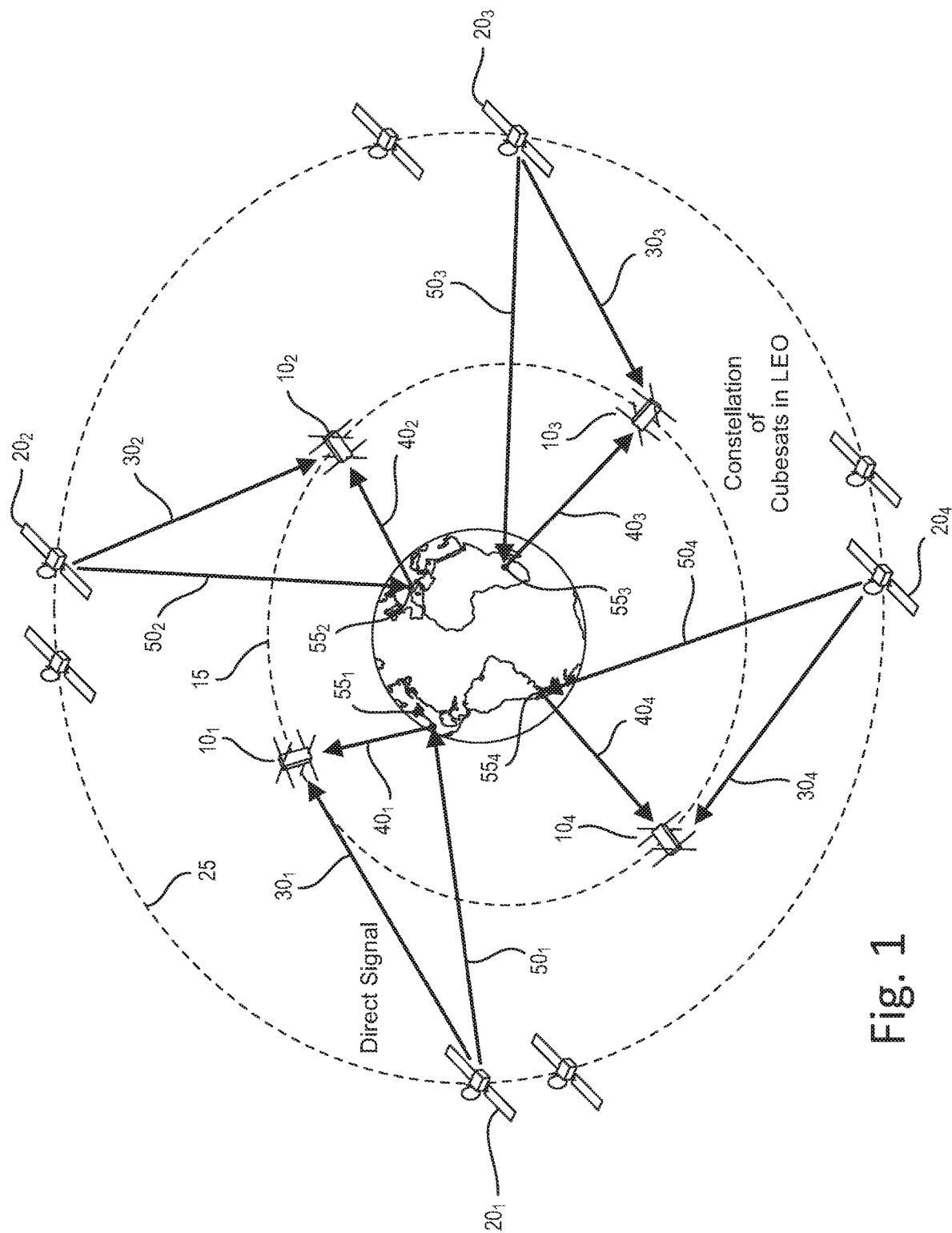
FIG. 1 illustrates satellites with antenna systems in accordance with one embodiment.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

CubeSat and other types of small satellite platforms use a single omnidirectional dipole antenna to receive RF signals. Such an antenna is incapable of directing its beam in a desired direction, which consequently makes them prone to noise and jamming. In accordance with one or more embodiments, an antenna system is provided on a small satellite platform that steers antenna beams from multiple cross-dipole antennas in desired directions. This allows the signals received by the antennas to maximize the strength of a desired signal and at the same time suppress unwanted signals. These embodiments are useful in a variety of contexts including, but not limited to, communication systems and remote sensing applications.

FIG. 1 illustrates an example of satellites that receive signals from or transmit signals to multiple sources. In FIG. 1, a first set of satellites $10_1$ to $10_4$ are spatially separated in a first orbit 15 and a second set of satellites $20_1$ to $20_4$ are spatially separated in a second orbit 25 around the earth. The first set of satellites $10_1$ to $10_4$ may include a respective number of directional antenna systems in accordance with the embodiments described herein. The second set of satellites $20_1$ to $20_4$ may be communication satellites, each including at least one signal-of-opportunity transmitter. In one example application, the first orbit may be a low earth orbit (LEO) and the second embodiment may be a geosynchronous orbit (GEO), but the first and/or second orbits may be different in another embodiment, even in cases where the first orbit is more distant from the earth than the second orbit.

In the example of FIG. 1, satellite $10_1$ includes a directional antenna structure that receives a direct signal $30_1$ from the transmitter of satellite $20_1$ and a signal $40_1$ from a target of interest $55_1$ on the earth. The signal $40_1$ may formed when a direct signal $50_1$ (which may also be transmitted from satellite $20_1$) is reflected from the target on the surface of the earth. The direct and reflected signals received by the antenna systems may be processed by logic in the first set of satellites $10_1$ to $10_4$ to extract desired information. For example, the logic in each of the first set of satellites may process the direct and reflected signals to recover physical properties of the target. In another embodiment, the receiver may process the direct and reflected signals to recover or determine another type of information.

Each of the satellites $10_2$ to $10_4$ include a similar directional antenna system that receives a respective one of direct signals $30_2$ to $30_4$ from satellites $20_2$ to $20_4$ and a respective one of signals $40_2$ to $40_4$ reflected from corresponding targets on the earth interest $55_2$ to $55_4$. The signals $40_2$ to $40_4$ may be reflected from corresponding targets on the earth that respectively receive direct signals $50_2$ to $50_4$ from transmitters of satellites $20_2$ to $20_4$. The direct and reflected signals received by the directional antenna system of each of the satellites $10_2$ to $10_4$ may be processed to extract desired information, as previously indicated.

Figure 2:
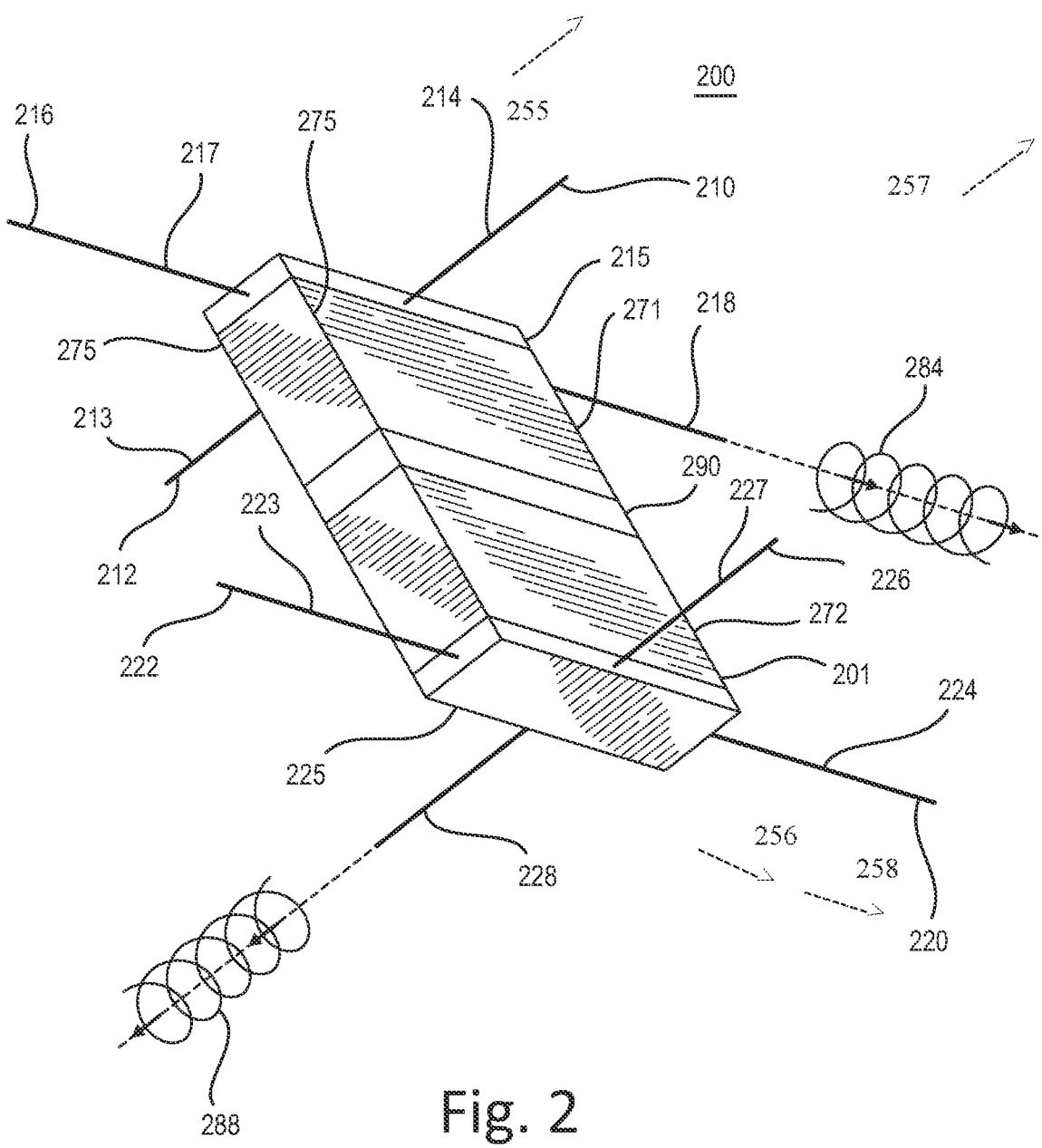
FIG. 2 illustrates an embodiment of an antenna system.

FIG. 2 illustrates an embodiment of a directional antenna system 200 for each of the satellites $10_1$ to $10_4$ in FIG. 1. The directional antenna system may include a smart antenna for a satellite 201 having, for example, a CubeSat or other type of small satellite platform. In one embodiment, the satellite 201 may have a 6U CubeSat platform.

The directional antenna system 200 includes a first cross-dipole antenna 210 and a second cross-dipole antenna 220. The first cross-dipole antenna 210 includes a first dipole antenna 212 and a second dipole antenna 216 arranged at a predetermined angle relative to the first dipole antenna. The predetermined angle may be, for example, in a range of 80° to 100°, and may be 90° in one particular embodiment. In addition, the first dipole antenna 212 may include a first monopole antenna 213 and a second monopole antenna 214 extending from first set of opposing sides of a mechanical support 215. The second dipole antenna 216 may include a third monopole antenna 217 and a fourth monopole antenna 218 extending from second set of opposing sides of the mechanical support 215. In one embodiment, the opposing sides in the first set may be orthogonal to respective ones of the opposing sides in the second set. In FIG. 2, the mechanical support has a rectangular shape but may have a different shape in another embodiment. Also, the mechanical support 215 may be made of a non-conductive material to prevent interference with the signals received by the antenna.

The second cross-dipole antenna 220 may have a structure similar to the first cross-dipole antenna 210. For example, the first cross-dipole antenna 220 includes a first dipole antenna 222 and a second dipole antenna 226 arranged at a predetermined angle relative to the first dipole antenna 222. The predetermined angle may be, for example, in a range of 80° to 100°, and may be 90° in one particular embodiment. In addition, the first dipole antenna 222 may include a first monopole antenna 223 and a second monopole antenna 224 extending from first opposing sides of a mechanical support 225. The second dipole antenna 226 may include a third monopole antenna 227 and a fourth monopole antenna 228 extending from second opposing sides of the mechanical support 225. In one embodiment, the first opposing sides may be orthogonal to the second opposing sides. The mechanical support may have a rectangular shape or another shape. Also, the mechanical support 225 may be made of a non-conductive material to prevent interference with the signals received by the antenna. Thus, in this embodiment, the directional antenna system includes altogether eight monopole antennas arranged to form two pairs of cross-dipole antennas.

The dipoles in each cross-dipole antenna may be aligned along the same or a different axis. Additionally, the lengths of the dipoles in cross-dipole antenna 210 may be equal to or different from the lengths of the dipole antennas in cross-dipole antenna 220. These lengths may be determined based on the wavelengths (or frequency) of the signals to be received by the antennas. For example, as discussed in greater below, in one implementation each cross-dipole antenna may receive signals from different sources. The signals from these sources may be in the same or different frequency bands (or wavelengths). Accordingly, the dipoles in each cross-dipole antenna may have a length equal to (or otherwise based on) one-half wavelength of the signals that are to be received by that cross-dipole antenna. For example, the lengths of the dipoles may be one-half of a center wavelength in a frequency band of the signals to be received. In one embodiment, the signals to be received by the cross-dipole antennas are circularly polarized (e.g., the cross-dipole antennas are operated in respective axial modes) and receive signals, for example, in the very high frequency (VHF) frequency band. Examples of the circularly polarized signals received by the cross-dipole antennas are respectively labeled 284 and 288 in FIG. 2.

The mechanical supports 215 and 225 of the cross-dipole antennas may be mounted to different (e.g., opposing) sides of a frame 275. In the case of a CubeSat platform, the frame may include two or more individual, smaller (e.g., 1U) CubeSat satellites 271 and 272. Receiving, transmitting, and signal processing logic may be included in an intermediate section 290 located, for example, at a central location of the frame 275. The receiving logic receives signals from both cross-dipole antennas within one or more corresponding frequency bands, which signals are then processed to recover information relating to the target (or area) of interest, e.g., soil moisture, ocean temperature, ice thickness, wind speed, imagery, and/or other target-specific features. The transceiving logic may transmit processing results through one or more of the cross-dipole antennas (or through another antenna on the satellite platform) to a ground station for analysis and archiving.

In one embodiment, each of the satellites $10_1$ to $10_4$ may be equipped with two separate directive antennas which point in different directions. One antenna may point to the target on the ground and is supposed to receive only the signal reflected from the target. The other antenna may point to another satellite (e.g., called a Signal of Opportunity Transmitter) and is supposed to collect the direct path reference signal. However, because of the close proximity of the two antennas, each of them receives both (direct as well as reflected) signals. The direct signal may be an order of magnitude stronger than the reflected signal. Thus, the direct signal may be suppressed or isolated from the reflect channel below for accuracy purposes.

In some systems which have been proposed, isolation between the two channels is provided using the body of the spacecraft as an insulating screen. For small CubeSat platforms, it may be difficult or impossible to provide such insulating screen. Additionally, in order to estimate the direction of the direct and reflected signals, some proposed approaches assume a prior knowledge of locations of the first and second satellites.

In accordance with one or more embodiments, autonomous estimation of the direction of the illuminator of opportunity (or signal-of-opportunity) and the target location on the ground is performed. Using these estimations, array weighting factors may be obtained to direct the antenna beam in one case toward the second satellite (e.g., a corresponding one of satellites $20_1$ to $20_4$) and in the other case towards the reflecting target (e.g., a corresponding one of targets $55_1$ to $55_4$). This approach provides a considerable operational advantage because the position of the transmitter does not need to be known a priori. Moreover, it makes multi-static (when there is more than one signal-of-opportunity transmitter) operation possible without having to modify the physical setup. These embodiments represent a further improvement in that a large number of antenna elements used other approaches make estimation relatively simple. Due to the lack of degrees of freedom, it is much more challenging when only a two element array antenna is available, as in the case with embodiments described herein.

In operation, the dipole antennas 212 and 216 of the first cross-dipole antenna 210 may be fed in phase-quadrature. This may involve passing currents through these dipole antennas that are equal in magnitude but out-of-phase by a predetermined phase-shift, e.g., 90 degrees. The dipole antennas 222 and 226 of the second cross-dipole antenna 220 may also be driven in phase quadrature using the same phase shift. The cross-dipole antennas may receive signals in the same frequency band or different frequency bands.

In order to recover desired information relating to the target of interest, the antenna gain of the first cross-dipole antenna 210 is controlled to be maximized in a first direction and the antenna gain of the second cross-dipole antenna 220 is controlled to be maximized in a second direction different from the first direction. The controlling may be performed by beam steering logic in the satellite, to be discussed in greater detail below. The first direction 255 may be aligned with electromagnetic waves propagating along a first path, and the second direction 256 may be aligned with electromagnetic waves propagating along a second path. The waves 257 and 258 may be, for example, circularly polarized as illustrated in FIG. 2, but the waves may have a different polarization in another embodiment. The receiving logic in the central section 290 of the frame 275 may control the beam widths and directions of the cross-dipole antennas, so that the main lobes of their corresponding antenna patterns have predetermined widths and directions aligned with the first and second directions, respectively. The directions and widths of the cross-dipole antennas may be controlled to reduce or minimize the gain of signals from unwanted sources (coincident with side lobes of the antenna patterns) that may interfere with the recovery of desired information.

Figure 3:
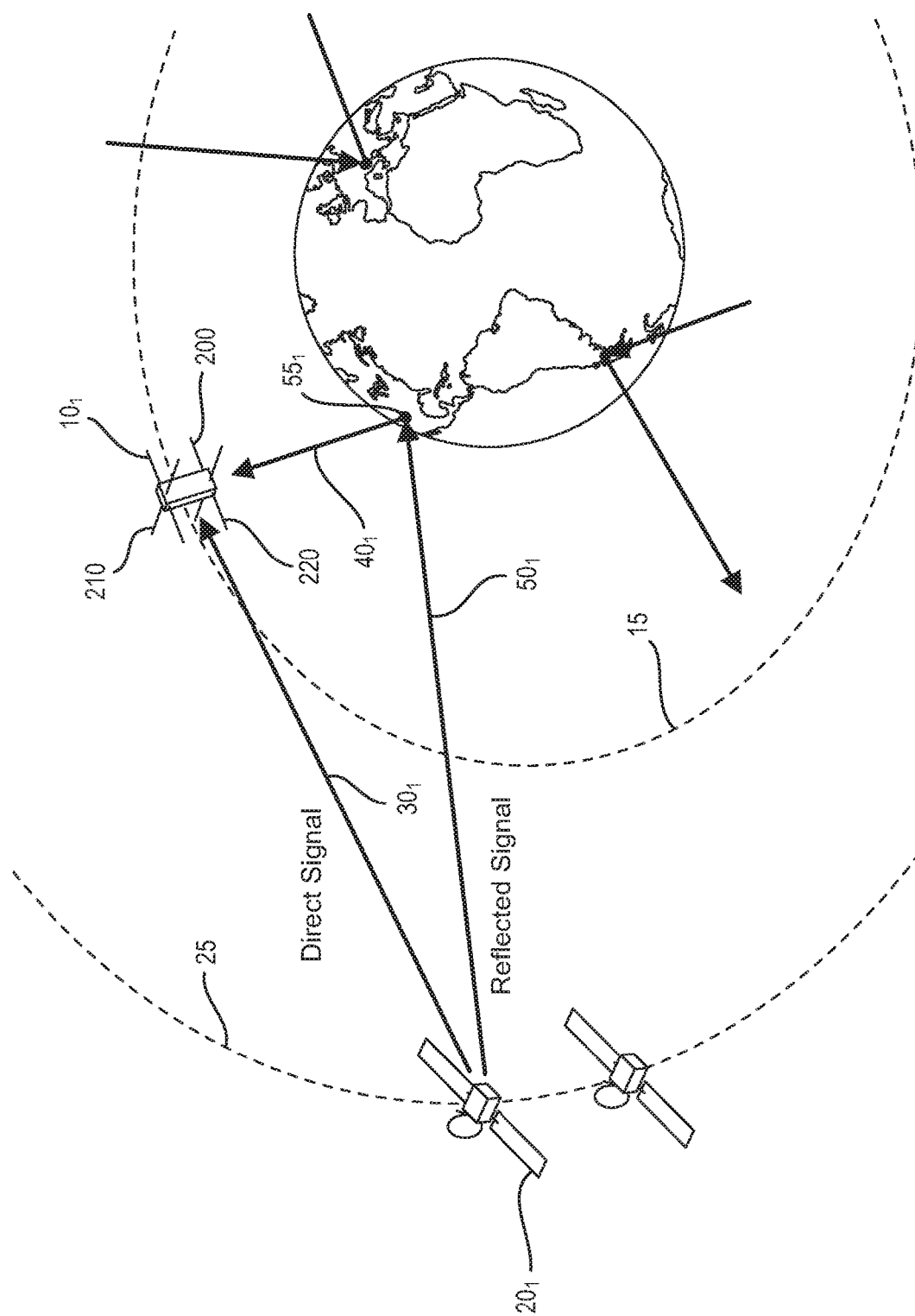
FIG. 3 illustrates an operational embodiment of the antenna system.

FIG. 3 illustrates an example of the beam directions of the cross-dipole antennas on satellite $10_1$ of FIG. 1. In this example, the target of interest $55_1$ is on the surface of the earth. The antenna gain of the first cross-dipole antenna 210 may be maximized in the direction of a satellite 201 and the antenna gain of the second cross-dipole antenna 220 may be maximized in the direction of the target on the earth. The first direction is aligned with a first path between the first cross-dipole antenna 210 and satellite 201 and the second direction is aligned with a second path between the second cross-dipole antenna 220 and target $55_1$.

Figure 4:
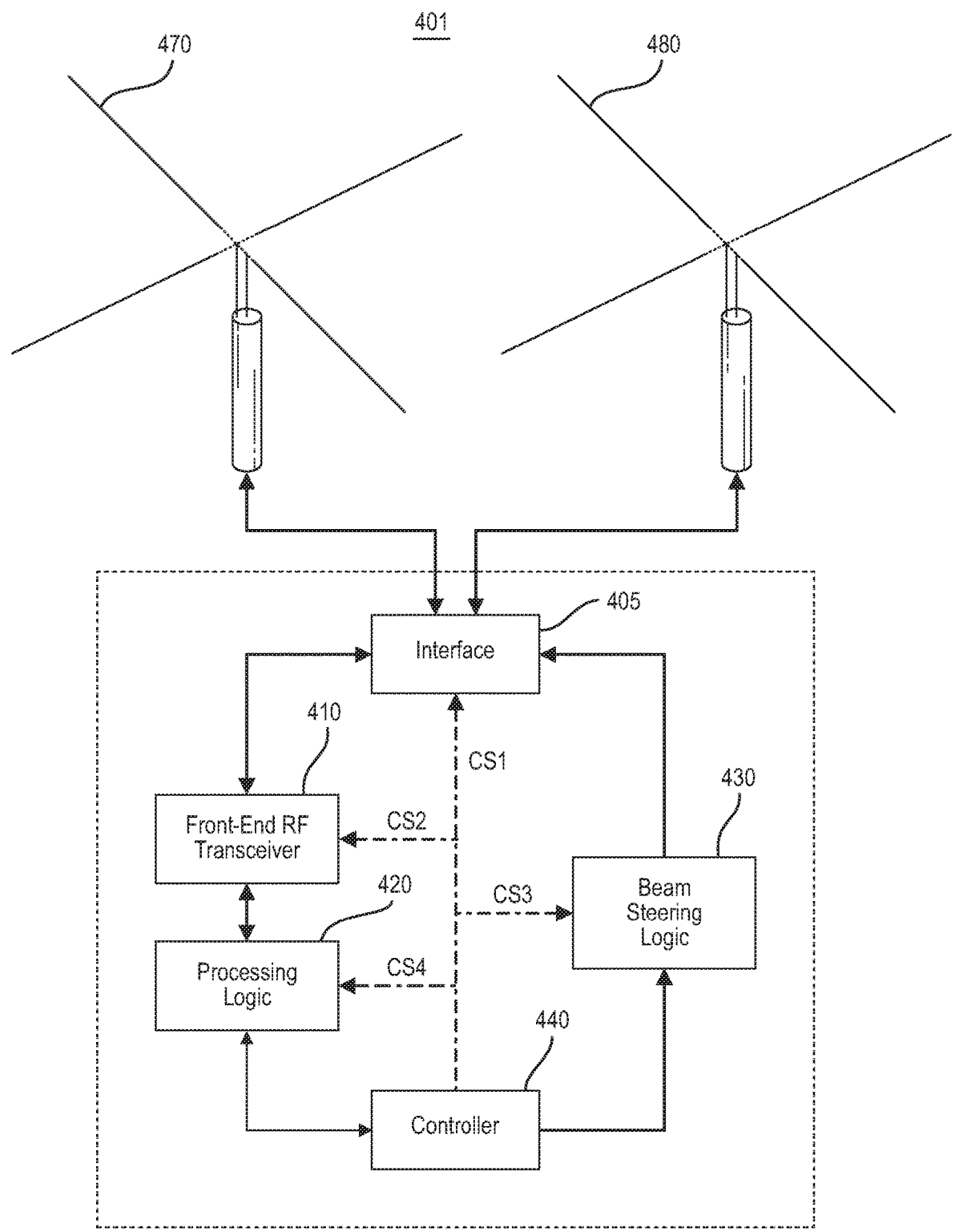
FIG. 4 illustrates an embodiment of an antenna system including processing logic.

FIG. 4 illustrates an embodiment of a system 401 which includes an interface 405, front-end RF logic 410, processing logic 420, beam steering logic 430, and a controller 440. These features may be included at a predetermined location of the frame of the satellite platform. The system may be implemented with an antenna system which includes two directional cross-dipole antennas 470 and 480, which, for example, may correspond to the ones illustrated in FIG. 2.

Referring to FIG. 4, the front-end RF logic 410 may include a transceiver for demodulating, mixing, filtering, amplifying, and/or converting signals received through the first and second cross-dipole antennas 470 and 480. These operations result in the recovery of baseband (or intermediate frequency) signals including data and/or other information of interest. The signals may be received in one or more predetermined frequency bands, e.g., at least one of the frequency bands may be in the VHF range as previously described, or the signals may be received in a different frequency band based on the intended application.

The processing logic 420 may process the signals output from the front-end RF logic 410 in order to recover desired data and/or other information. For example, the processing logic may perform various tracking and navigation operations relating to the target of interest and/or the satellite(s) to allow signals to be received through the cross-dipole antennas. The processing logic 420 may also process signals to be transmitted through the transceiver of the front-end RF logic 410 to a ground station or another satellite. The transmitted signals may convey the data and/or other information recovered by the processing logic. The processing logic 420 may also store various types of data in accordance with these or other operations.

The beam steering logic 430 may steer a first beam of the first cross-dipole antenna 470 in a first direction and may steer a second beam of the second cross-dipole antenna 480 in a second direction different from the first direction. The first direction is aligned with a first signal path between the first cross-dipole antenna 470 and one of the satellite or the target. The second direction is aligned with the second cross-dipole antenna 480 and the other one of the satellite or the target. The main lobe directions (e.g., the maximum gain) of the cross-dipole antenna beams may be controlled as a result of the beam steering logic 430 controlling the phase and/or frequency of the current passing through the cross-dipole antennas. The relative distance, direction, and orientation of the antenna system may change as a result over time. When this occurs, the beam steering logic may change the directions of the beams of the cross-dipole antennas to maintain a constant track of the satellite and/or the target. By steering the beams of the cross-dipole antennas, spurious or unwanted signals received from other directions are suppressed, thereby allowing for improved isolation of the signals of interest.

In a 6U CubeSat embodiment, the receiving logic for the directional antenna system may support four VHF receiver channels in a frequency band of 240 MHz to 270 MHz, with a center frequency of 250 MHz. Each channel may be connected to the four dipole antennas making up the two cross-dipole antennas and is directional in nature. The directionality of each channel is achieved, in part, based on the strong mutual coupling that exists among the cross-dipole antennas as a result of being mounted on the relatively small 6U CubeSat platform. This strong mutual coupling is used to make the combined system directional. More specifically, the signals from each channel are combined to achieve a maximum beam direction that can be steered in any desired direction. The strong mutual coupling may be achieved as follows. Because of their omnidirectional patterns, close proximity, and alignments, individual antennas have strong mutual coupling (e.g., ~10 dB at the center frequency). In the far field, their patterns will add constructively in some directions and destructively in the other directions. By appropriate selection of the complex weighting factors on their received signals, these directions of constructive and destructive interferences may be adjusted to obtain desired antenna patterns, e.g., to steer the main lobe(s) of the radiation beam of the antenna system. The presence of the mutual coupling between the antennas makes it more complex to estimate the weighting factors. In accordance with one embodiment, these mutual couplings are taken into consideration while weighting factor estimation.

In one embodiment, the receiver may implement an adaptive beam steering technique to control the directionality of the cross-dipole antennas. One example of an adaptive beam steering technique that may be used is adaptive array processing. This type of processing may be used, for example, to steer the receiver beam (e.g., radiation beam) of the antenna system towards one or more geosynchronous satellites (e.g., GEO satellites) and to steer the receiver beam (e.g., radiation beam) of the antenna system toward the target. When the beam is steered towards the target (e.g., on the ground), the receiver may provide, for example, an attenuation of 22 dB for the direct signal incident from the GEO satellite, thus isolating the reflected signal from the strong direct signal. While the satellite supporting the directional antenna structure has been described herein as including a receiver, in other embodiments the receiver may include a transceiver in order to give the satellite both transmission and reception capability.

The controller 440 may generate various signals (e.g., CS1 to CS 4) for control the timing and operation of the front-end RF logic 410, processing logic 420, beam steering logic 430, and switching of the interface 405. For example, when the front-end RF logic is a transceiver as illustrated in FIG. 4, the controller 440 may coordinate the switch of the interface 405 to allot time slots for receiving and transmitting signals through the directional cross-dipole antennas. The controller 440 may also control the beam steering logic 430 to perform tracking operations and otherwise change the directions and/or formations of the beams of the cross-dipole antennas. In addition to these features, the controller 440 may communicate with a ground station for purposes of receiving software updates for the on-board logic and transmitting data and information of interest recovered from the signals received through the directional cross-dipole antennas.

Antenna Beam Steering

Steering the antenna radiation beam in one case to the second satellite and in another case towards a desired target (a specular point) may be performed based on a two-stage process. In the first stage, the direction of the direct signal path towards the second satellite and the direction of the reflected signal path (e.g., toward the specular point on the ground) are determined. In the second stage, appropriate weighting coefficients are estimated to steer the radiation beam in these desired directions. The manner in which these stages are performed represents a significant improvement.

According to one proposed procedure, the directions (direct and reflect signal paths) may be estimated assuming a prior knowledge of the locations of first and second satellites. The first satellite may be assumed to carry an Inertial Navigational Unit (INU). From the time stamped INU data, the position of the first satellite may be determined. The second satellite may be assumed to be at a location in a geostationary (GEO) orbit. This location may be determined from the published information. From the knowledge of their locations and following simple geometrical calculations, the directions of the direct and reflected signal paths may be estimated. Such a procedure is not adequate for real time applications.

In accordance with one embodiment, an autonomous estimation procedure may be performed to determine the direction of the second satellite (e.g., illuminator-of-opportunity) and the direction of the target (e.g., specular reflection point) on the ground. As previously indicated, autonomous estimation presents a considerable operational advantage because the position of the transmitter does not need to be known a priori. Moreover, autonomous estimation makes multi-static operation possible without having to modify the physical setup of the first satellite.

Estimating the direction of the illuminator-of-opportunity may be relatively simple when an array with a large number of antenna elements is used. However, in the present case, the first satellite uses far fewer antenna elements, and in one embodiment uses only two cross-dipole antennas. Thus, compared to the case of a satellite platform including an array of a large number of antenna elements, it is much more challenging to estimate the direction of the illuminator-of-opportunity when only two-cross dipole antennas are used because of the lack of degrees of freedom.

For an autonomous estimation of angles-of-arrival for direct and reflected signals, the received power (e.g., power transmitted by stationary transmitters and targets) may be recorded by a moving receiver (e.g., 6U CubeSat moving in a LEO). When the moving receiver records these transmitted signals, the receiver will be looking at the stationary transmitters and targets from different look angles. The received signal, received at the different positions of the receiver over some time period, may be appropriately processed to estimate the direct and reflected signal paths. Mathematically, this procedure may be explained as follows.

Stage 1: Estimation of Direct and Reflected Signal Paths

In estimating the direction of direct and reflected signal paths, let the direction of the direct signal path signal be $\theta_d = \theta_1$ and the direction of the reflected signal path be $\theta_e = \theta_2$. Along with these two signals, the receiver would be receiving signals for other interfering signals. The signal source directions may be referred to as $\theta_3, \theta_4, \ldots \theta_K$. The total received power from all of these external sources may be expressed by Equation (1).

$$p(\tilde{\theta}) = \sum_{k=1}^{K} |A(\tilde{\theta} - \theta_k)|^2 p_k, \quad (1)$$

where $A(\tilde{\theta} - \theta_k)$ is the antenna power pattern when the antenna is pointing towards $\tilde{\theta}$ and receiving signal from a source from $\theta_k$ and $p_k$ is the power of the $k^{th}$ source.

Now, let $|A(\tilde{\theta} - \theta_k)|^2 = a(\tilde{\theta} - \theta_k)$ and assume the antenna pattern exists over $0 < \theta < 2\pi$ and repeats after $2\pi$, meaning that the antenna pattern is periodic in $\theta$. Based on these assumptions, the antenna pattern may be expressed as the Fourier expansion indicated in Equation (2).

$$a(\theta) = \sum_{m=-M}^{M} a_m e^{jm\theta} \quad (2)$$

Using (2), Equation (1) may be written as Equation (3).

$$p(\tilde{\theta}) = \sum_{k=1}^{k=K} \sum_{m=-M}^{m=M} a_m p_k e^{jm(\tilde{\theta} - \theta_k)} \quad (3)$$

Changing the order of summation, Equation (3) may be expressed by Equation (4).

$$p(\tilde{\theta}) = \sum_{m=-M}^{m=M} a_m e^{jm\tilde{\theta}} \sum_{k=1}^{k=K} p_k e^{-jm(\theta_k)} \quad (4)$$

The inner summation may be written as Equation (5).

$$y_m = \sum_{k=1}^{K} p_k e^{-jm\theta_k} \quad (5)$$

Hence, Equation (4) may be written as Equation (6).

$$p(\tilde{\theta}) = \sum_{m=-M}^{M} a_m y_m e^{jm\tilde{\theta}} \quad (6)$$

From Equation (6), it is clear that if the power received by the antenna system is measured by varying the antenna pointing direction $\tilde{\theta}$, then it will be possible using discrete Fourier transform to estimate $a_m y_m$ for m=−M, −M+1, ... M. This may be explained as follows.

Let us say we measure $p(\tilde{\theta})$ for $\tilde{\theta}_1, \tilde{\theta}_2, \ldots \tilde{\theta}_L$. Then, Equation (6) may be expressed in a matrix form in the manner indicated in Equation (7).

$$\begin{bmatrix} p(\tilde{\theta}_1) \\ p(\tilde{\theta}_2) \\ \cdot \\ p(\tilde{\theta}_L) \end{bmatrix} = \quad (7)$$

$$\begin{bmatrix} a_{-M} e^{-jM\tilde{\theta}_1} & a_{-(M-1)} e^{-j(M-1)\tilde{\theta}_1} & \cdot & a_M e^{jM\tilde{\theta}_1} \\ a_{-M} e^{-jM\tilde{\theta}_2} & a_{-(M-1)} e^{-j(M-1)\tilde{\theta}_2} & \cdot & a_M e^{jM\tilde{\theta}_1} \\ \cdot & \cdot & \cdot & \cdot \\ a_{-M} e^{-jM\tilde{\theta}_L} & a_{-(M-1)} e^{-j(M-1)\tilde{\theta}_L} & \cdot & a_M e^{jM\tilde{\theta}_L} \end{bmatrix} \begin{bmatrix} a_{-M} y_{-M} \\ a_{-M+1} y_{-(M-1)} \\ \cdot \\ a_M y_M \end{bmatrix}$$

First, the radiation pattern of antenna system may be expressed in terms of its exponential expansion (Fourier expansion). This will give the maximum value of M and corresponding $a_m$, m=−M,−M+1, ... M.

Second, as the first satellite moves, it will be receiving power for the second satellite with a different antenna orientation. This may be recorded for L locations of the first satellite ($\tilde{\theta}_1, \tilde{\theta}_2, \ldots \tilde{\theta}_L$).

Third, this will be an ill-posed problem, because the number of observations L will be much less than (2M+1) unknowns.

Given these considerations, the matrix may be written as $[p]_{L \times 1} = [A]_{L \times (2M+1)}[y']_{(2M+1)}$ and the Least Square Method (LSM) may be used to solve for [y']. In so doing, this equation may be pre-multiplied in the manner indicated in Equation (8).

$$[A]^H[y']_{(2M+1)} = [[A]^H[A]_{L \times (2M+1)}]^{-1}[A]^H[p]_{L \times 1} \quad (8)$$

Knowing [y'] and using Equation (5), the angles $\theta_k$ may be estimated. Once the direction of direct and reflected signal paths are estimated, beam steering may be performed.

Stage 2: Estimation of Weighting Factors to Enhance Reflected Signal

With the directions of the direct and reflected signal paths estimated, the weighting factors for separating the direct and reflected signals signals may be estimated using following approach.

Figure 5:
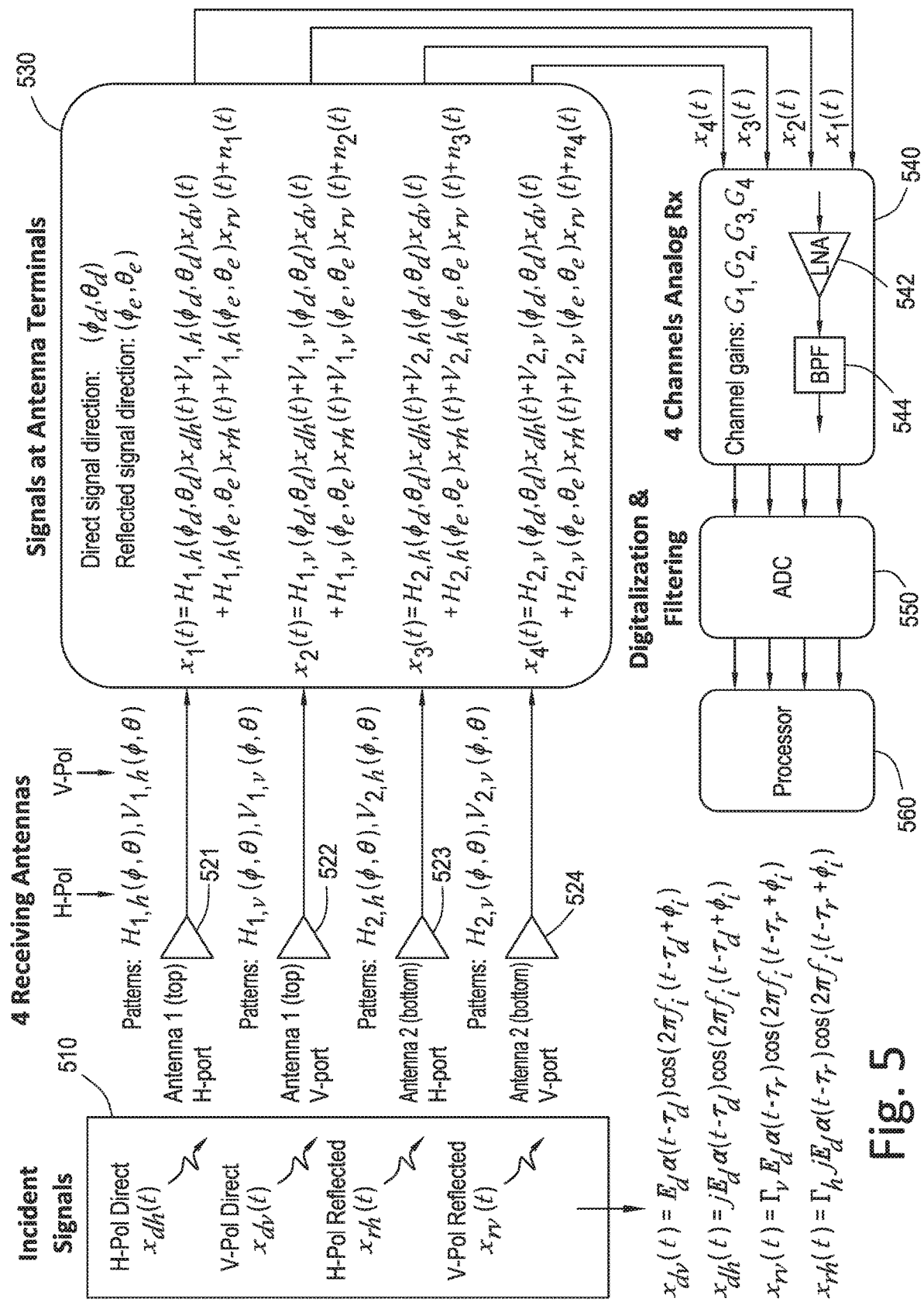
FIG. 5 illustrates an embodiment of beam steering logic of the antenna system.

FIG. 5 illustrates an embodiment of receiving and processing logic that may be used to determine the weights (or weighting factors). When applied to the two cross-dipole antennas, one of the cross-dipole antennas may be referred to as a sky-looking cross-dipole antenna and the other cross-dipole antenna may be referred to as a ground-looking cross-dipole antenna. These antennas collectively receive four incident signals 510: a horizontally polarized signal along the direct signal path (H-Pol Direct), a vertically polarized signal along the direct signal path (V-Pol Direct), a horizontally polarized signal along the reflected signal path (H-Pol Reflected), and a vertically polarized signal along the reflected signal path (V-Pol Reflected).

The sky-looking cross-dipole antenna has one co-pol (Antenna 1 H-port) 521 aligned with horizontal polarization and a cross pol (Antenna 1 V-port) 522 aligned with vertical polarization. The ground-looking cross-dipole antenna has a co-pol (Antenna 2 H-port) 523 aligned with vertical polarization and a cross pol (Antenna 2 V-port) aligned with horizontal polarization. Hence, each arm of both cross-dipole antennas receives horizontal and vertical polarized parts of both of the direct and reflected signals. This situation may be mathematically represented as follows.

If $[x_{in}] = [x_{dh}(t)\ x_{dv}(t)\ x_{rh}(t)\ x_{rv}(t)]^T$ is the input signal at the location of the antenna array, the received signals $x_1(t), x_2(t), x_3(t), x_4(t)$ at the antenna terminals 530 may be expressed by Equation (9).

$$\begin{bmatrix} x_1(t) \\ x_2(t) \\ x_3(t) \\ x_4(t) \end{bmatrix} = \begin{bmatrix} H_{1d} & V_{1d} & H_{1e} & V_{1e} \\ H_{2d} & V_{2d} & H_{2e} & V_{2e} \\ H_{3d} & V_{3d} & H_{3e} & V_{3e} \\ H_{4d} & V_{4d} & H_{4e} & V_{4e} \end{bmatrix} \begin{bmatrix} x_{dh}(t) \\ x_{dv}(t) \\ x_{rh}(t) \\ x_{rv}(t) \end{bmatrix} \quad (9)$$

where $x_{dh}(t), x_{dv}(t)$ are horizontal and vertical polarized components, respectively, of the direct signal, $x_{rh}(t), x_{rv}(t)$ are respective horizontal and vertical polarized components of the reflected signal and the horizontal and vertical radiation patterns of the four antenna elements of the two cross-dipole antennas may be expressed as: $H_{id} = H_i(\theta_d, \phi_d)$, i=1, 2, 3, 4, $H_{ie} = H_i(\theta_e, \phi_e)$, i=1, 2, 3, 4, $V_{id} = V_i(\theta_d, \phi_d)$, i=1, 2, 3, 4, and $H_{id} = V_i(\theta_d, \phi_d)$, i=1, 2, 3, 4. Also, $(\theta_d, \phi_d)$ is the direct signal direction and $(\theta_e, \phi_e)$ is the reflect signal direction. These angles may be estimated as previously explained.

This expression may be written in a more compact form as set forth in Equation (10).

$$[x] = [A][x_{in}] \quad (10)$$

The signals at the antenna terminals are input into a receiver 540, which includes a low-noise amplifier (LNA) 542 coupled to a bandpass filter 544. When the receiver gains are taken into consideration, the signals at the end of each receiver channel may be expressed by Equation (11).

$$[X] = [G][A][x_{in}] = [B][x_{in}], \quad (11)$$

where $$[G] = \begin{bmatrix} G_1 & 0 & 0 & 0 \\ 0 & G_2 & 0 & 0 \\ 0 & 0 & G_3 & 0 \\ 0 & 0 & 0 & G_4 \end{bmatrix}, [B] = [G][A] \text{ and } [X] = [x_1\ x_2\ x_3\ x_4]^T.$$

To develop an appropriate extraction algorithm, the signals $x_1, x_2, x_3,$ and $x_4$ may be respectively proportional to the input signals $x_{dh}, x_{dv}, x_{rh}, x_{rv}$. However, from Equation (11), it is clear that the recorded signal $x_1$ is not only dependent upon $x_{dh}$ but also dependent upon other signals $x_{dv}, x_{rh}, x_{rv}$. Likewise, the recorded signals $x_2$, $x_3$, and $x_4$ may not only be respectively dependent upon $x_{dv}, x_{rh}, x_{rv}$, but may also have contributions from other input signals.

The mutual coupling between the signals may be suppressed to a predetermined acceptable level (20 dB). This may be achieved, for example, using following procedure. Initially, the received signal [X] may be multiplied by weighting coefficients in order to suppress coupling between the channels. For example, in order to maximize contribution of $x_{dh}(t)$ to $x_1$, weighting factors may be computed that satisfy Equation (12).

$$\begin{bmatrix} 1 \\ 0 \\ 0 \\ 0 \end{bmatrix} = [B^T] \begin{bmatrix} w_{11} \\ w_{21} \\ w_{31} \\ w_{41} \end{bmatrix} \quad (12)$$

Equation (12) may be solved as follows:

$$\begin{bmatrix} w_{11} \\ w_{21} \\ w_{31} \\ w_{41} \end{bmatrix} = [B^T]^{-1} \begin{bmatrix} 1 \\ 0 \\ 0 \\ 0 \end{bmatrix} \quad (13)$$

Likewise, to maximize contribution $x_{dv}(t)$ to $x_2$, the observed signals may be multiplied with the coefficients expressed in Equation (14).

$$\begin{bmatrix} w_{12} \\ w_{22} \\ w_{32} \\ w_{42} \end{bmatrix} = [B^T]^{-1} \begin{bmatrix} 0 \\ 1 \\ 0 \\ 0 \end{bmatrix} \quad (14)$$

The entire coefficient matrix may be expressed by Equation (15).

$$\begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} = [B^T]^{-1} \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (15)$$

After appropriately weighing the received signal [X], the estimated signals may be expressed by Equation (16).

$$[X] = [W^T][X]$$

$$= [[B^T]^{-1}[I]]^T[X]$$

$$= [[B^T]^{-1}[I]]^T[B][x_{in}] \quad (16)$$

Once the channel signals have been decoupled, they may be input into an analog-to-digital converter 550 and then to a processing logic 560, where the now-digital channel signals are processed to perform a predetermined application and/or transmitted to a ground station for further analysis.

Figure 6:
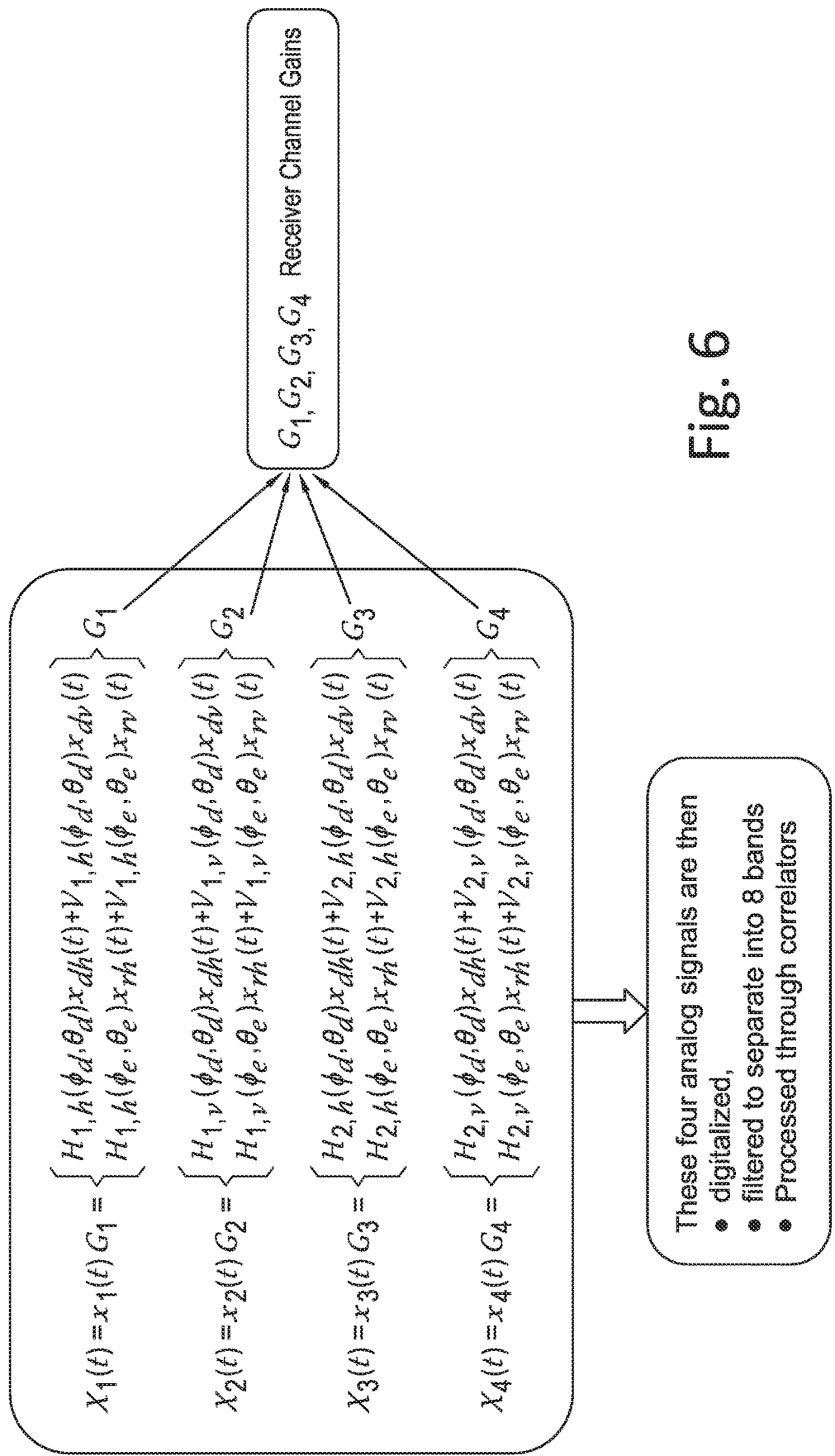
FIG. 6 illustrates an embodiment of amplified signals output from a receiver of the antenna system.

FIG. 6 illustrates an embodiment of amplified signals output from a receiver of the antenna system. The amplified signals $X_1(t)$ to $X_4(t)$ are generated based on four corresponding receiver channel gains $G_1$ to $G_4$ as previously explained. The amplified signals illustrated in FIG. 6 corresponding to ones that may exist prior being digitized in ADC 550. The processing logic 560 may then filtered to separate these signals into a predetermined number (e.g., 8) of bands. Once separated, the signals may be further processed through correlators.

In one embodiment, a constellation of CubeSats may be equipped with antenna systems as described herein. For example, in one application the CubeSats may be placed in the same or different (e.g., LEO) orbits with multi-channel VHF receivers for measuring soil moisture and/or other earth science parameters on a global scale. The parameters may be determined based on signals directly transmitted by one or more GEO communication satellites and signals reflected from one or more targets of interest. Because of the volume and weight constraints imposed by small satellite platforms (e.g., such as any one of a variety of CubeSat platforms), the use of cross-dipole antennas in accordance with one or more embodiments allow for the efficient reception and recovery of information corresponding to these parameters.

The receivers, processors, receiving or transceiving logic, beam steering logic, processing logic filters, suppression logic, and other signal-generating and signal-processing features of the embodiments disclosed herein may be implemented in logic which, for example, may include hardware, software, or both. When implemented at least partially in hardware, the receivers, processors, receiving or transceiving logic, beam steering logic, processing logic, filters, suppression logic, and other signal-generating and signal-processing features may be, for example, any one of a variety of cross-dipole circuits including but not limited to an application-specific cross-dipole circuit, a field-programmable gate array, a combination of logic gates, a system-on-chip, a microprocessor, or another type of processing or control circuit.

When implemented in at least partially in software, the receivers, processors, receiving or transceiving logic, beam steering logic, processing logic, filters, suppression logic, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A system, comprising:
a passive receiver;
a first cross-dipole antenna on a platform;
a second cross-dipole antenna on the platform; and
beam steering logic for the first and second cross-dipole antennas,
wherein the beam steering logic is configured to steer a radiation beam of the passive receiver in a first direction and to steer the radiation beam of the passive receiver in a second direction different from the first direction, the first direction aligned with a direct signal path and the second direction aligned with a reflect signal path, and wherein the platform is of a first satellite and the direct signal path is aligned with a second satellite.

2. The system of claim 1, wherein:
the first satellite is a transmitter or receiver satellite,
the second satellite is a signal-of-opportunity transmitter satellite, and
the reflect signal path is aligned with a target of interest at a surface location.

3. The system of claim 1, wherein the beam steering logic is configured to autonomously determine angles-of-arrival for the direct signal path and the reflected signal path.

4. The system of claim 1, wherein:
each of the first cross-dipole antenna and the second cross-dipole antenna is to receive signals from both the direct signal path and the reflected signal path by mutual coupling, and
the beam steering logic is configured to control weights to isolate corresponding ones of the signals received by the first cross-dipole antenna and the second cross-dipole antenna along the direct signal path and the reflected signal path.

5. The system of claim 1, wherein:
the passive receiver is configured to receive signals from the first cross-dipole antenna and the second cross-dipole antenna, and
the passive receiver is at a location between the first cross-dipole antenna and the second cross-dipole antenna on the platform.

6. The system of claim 5, wherein the beam steering logic is configured to:
maximize a gain of the radiation beam to correspond to the first direction to receive a signal from the second satellite, and
maximize a gain of the radiation beam to correspond to the second direction to receive a reflected signal from a target of interests at a surface location.

7. The system of claim 1, wherein the beam steering logic is configured to:
control a first set of weights to steer the radiation beam in the first direction; and
control a second set of weights to steer the radiation beam in the second direction,
wherein the first set of weights is different from the second set of weights.

8. The system of claim 1, further comprising:
processing logic configured to extract signals from the first cross-dipole antenna in a first frequency band and extract signals from the second cross-dipole antenna in a second frequency band.

9. The system of claim 8, wherein the first frequency band is equal to the second frequency band.

10. The system of claim 8, wherein at least one of the first frequency band and the second frequency band includes a very high frequency (VHF) frequency band.

11. The system of claim 1, wherein the platform of the first satellite is a CubeSat platform.

12. A system, comprising:
a passive receiver;
beam steering logic coupled to first and second cross-dipole antennas; and
processing logic configured to process signals from the first and second cross-dipole antennas, wherein the beam steering logic is configured to steer a radiation beam of the passive receiver in a first direction and to steer the radiation beam of the passive receiver in a second direction different from the first direction, the first direction aligned with a direct signal path and the second direction aligned with a reflect signal path, and wherein the first cross-dipole antenna and the second cross-dipole antenna are coupled to a platform of a first satellite and the direct signal path is aligned with a second satellite.

13. The system of claim 12, wherein:
the first satellite is a transmitter or receiver satellite,
the second satellite is a signal-of-opportunity transmitter satellite, and
the reflect signal path is aligned with a target of interest at a surface location.

14. The system of claim 13, wherein the target of interest is located on the earth;
each of the first cross-dipole antenna and the second cross-dipole antenna is to receive signals from both the direct signal path and the reflected signal path by mutual coupling, and
the processing logic is configured to control weights to isolate corresponding ones of the signals at each of the first cross-dipole antenna and the second cross-dipole antenna.

15. The system of claim 12, wherein the beam steering logic is configured to autonomously determine angles-of-arrival for the direct signal path and the reflected signal path.

16. The system of claim 15, wherein:
each of the first cross-dipole antenna and the second cross-dipole antenna is to receive signals from both the direct signal path and the reflected signal path by mutual coupling, and
the beam steering logic is configured to control weights to isolate corresponding ones of the signals received by the first cross-dipole antenna and the second cross-dipole antenna along the direct signal path and the reflected signal path.

17. The system of claim 12, wherein:
the passive receiver is configured to receive signals from the first cross-dipole antenna and the second cross-dipole antenna, and
the passive receiver is at a location between the first cross-dipole antenna and the second cross-dipole antenna.

18. The system of claim 17, wherein the beam steering logic is configured to:
maximize a gain of the radiation beam to correspond to the first direction to receive a direct signal from the second satellite, and
maximize a gain of the second beam to correspond to the second direction to receive a reflected signal from a target of interest at a surface location.

19. The system of claim 12, wherein the beam steering logic is configured to:
control a first set of weights to steer the radiation beam in the first direction; and
control a second set of weights to steer the radiation beam in the second direction,
wherein the first set of weights is different from the second set of weights.

20. The system of claim 12, further comprising:
processing logic configured to extract signals from the first cross-dipole antenna in a first frequency band and to extract signals from the second cross-dipole antenna in a second frequency band.

* * * * *